US012724363B2

(12) United States Patent
Watanabe et al.

(10) Patent No.: US 12,724,363 B2
(45) Date of Patent: Sep. 1, 2026

(54) MAGNET ROLLER, DEVELOPING ROLLER, AND IMAGE FORMING APPARATUS

(71) Applicant: KYOCERA DOCUMENT SOLUTIONS INC., Osaka (JP)

(72) Inventors: Yukimasa Watanabe, Osaka (JP); Kazuaki Ezure, Osaka (JP); Haruhiro Sato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 19/059,280

(22) Filed: Feb. 21, 2025

(65) Prior Publication Data

US 2025/0271791 A1 Aug. 28, 2025

(30) Foreign Application Priority Data

Feb. 22, 2024 (JP) ................................ 2024-025838

(51) Int. Cl.

*G03G 15/08* (2006.01)
*G03G 15/09* (2006.01)
*H01F 7/00* (2006.01)
*H01F 7/02* (2006.01)

(52) U.S. Cl.

CPC ....... *G03G 15/0921* (2013.01); *H01F 7/0221* (2013.01); *G03G 2215/0609* (2013.01); *G03G 2215/0861* (2013.01)

(58) Field of Classification Search

CPC ............... G03G 13/09; G03G 15/0808; G03G 15/0921; G03G 2215/0609; G03G 2215/0861; G03G 2215/0863; H01F 7/0221; H01F 7/0268; B03C 1/10; B03C 1/12; B03C 1/14; B03C 1/145

USPC .................... 399/275, 277; 430/45.32, 122.1

See application file for complete search history.

(56) References Cited

U.S. PATENT DOCUMENTS

| | | | | |
|---|---|---|---|---|
| 5,019,796 | A * | 5/1991 | Lee | H01F 13/003 335/302 |
| 5,030,937 | A * | 7/1991 | Loubier | G03G 15/0921 492/8 |
| 5,758,242 | A * | 5/1998 | Malespin | G03G 15/0921 492/38 |
| 6,788,178 | B2 * | 9/2004 | Inase | H01F 41/0253 29/895.21 |
| 8,750,768 | B2 * | 6/2014 | Kotani | G03G 15/0921 399/277 |
| 2003/0123908 | A1 * | 7/2003 | Jones | G03G 15/0921 399/277 |
| 2025/0258450 | A1 * | 8/2025 | Ezure | G03G 15/0921 |

FOREIGN PATENT DOCUMENTS

| | | |
|---|---|---|
| JP | 202220305 A | 2/2022 |

* cited by examiner

*Primary Examiner* — Robert B Beatty

(74) *Attorney, Agent, or Firm* — Li & Cai Intellectual Property Office

(57) ABSTRACT

A magnet roller includes a shaft, a plurality of magnets, and an adhesive. The plurality of magnets is arranged in a circumferential direction of a shaft center of the shaft on an outer surface of the shaft. The adhesive bonds the shaft and the plurality of magnets to each other. At least one of the magnets has a recess portion recessed with respect to a surface of the shaft, the surface facing the outer surface.

6 Claims, 9 Drawing Sheets

| No | Groove width [%] | First magnet 11d | | | Second magnet 21 (next pole) | |
|---|---|---|---|---|---|---|
| | | Maximum magnetic force [mT] | Magnetic center angle [° ] | Bond strength [kgf] | Maximum magnetic force [mT] | Magnetic center angle [° ] |
| 1 | 0% | 55±5 or less | 0±3 | 7~8 | 61 | 100 |
| 2 | 5% | 55±5 or less | 0±3 | 7~8 | 55±5 or less | 98 |
| 3 | 11% | 55±5 or less | 0±3 | 7~8 | 55±5 or less | 97 |
| 4 | 12% | 55±5 or less | 0±3 | 7~8 | 55±5 or less | 90±5 |
| 5 | 20% | 55±5 or less | 0±3 | 7~8 | 55±5 or less | 90±5 |
| 6 | 25% | 55±5 or less | 0±3 | 7~8 | 55±5 or less | 90±5 |
| 7 | 26% | 49 | 4 | 7~8 | 55±5 or less | 90±5 |
| 8 | 30% | 47 | 4 | 6~7 | 55±5 or less | 90±5 |
| 9 | 35% | 44 | 6 | 5~6 | 55±5 or less | 90±5 |

FIG.8A

| No | Groove depth [%] | First magnet 11d | | | Second magnet 21 (next pole) | |
|---|---|---|---|---|---|---|
| | | Maximum magnetic force [mT] | Magnetic center angle [° ] | Bond strength [kgf] | Maximum magnetic force [mT] | Magnetic center angle [° ] |
| 1 | 0% | 55±5 or less | 0±3 | 7~8 | 61 | 99 |
| 2 | 6% | 55±5 or less | 0±3 | 7~8 | 55±5 or less | 97 |
| 3 | 7% | 55±5 or less | 0±3 | 7~8 | 55±5 or less | 90±5 |
| 4 | 10% | 55±5 or less | 0±3 | 7~8 | 55±5 or less | 90±5 |
| 5 | 14% | 55±5 or less | 0±3 | 7~8 | 55±5 or less | 90±5 |
| 6 | 15% | 49 | 4 | 7~8 | 55±5 or less | 90±5 |
| 7 | 20% | 48 | 4 | 6~7 | 55±5 or less | 90±5 |
| 8 | 25% | 47 | 5 | 6~7 | 55±5 or less | 90±5 |
| 9 | 30% | 46 | 6 | 6~7 | 55±5 or less | 90±5 |

FIG.8B

MAGNET ROLLER, DEVELOPING ROLLER, AND IMAGE FORMING APPARATUS

CROSS-REFERENCE TO RELATED PATENT APPLICATION

This application claims the benefit of Japanese Priority Patent Application JP 2024-025838 filed Feb. 22, 2024, under 35 U.S.C. 119, the entire contents of which are incorporated herein by reference.

FIELD OF THE DISCLOSURE

The present disclosure relates a magnet roller, a developing roller, and an image forming apparatus.

BACKGROUND OF THE DISCLOSURE

Conventionally, in a developing part of an image forming apparatus, a developer is supplied to a photosensitive drum and toner images are formed on the photosensitive drum. Specifically, the developing part supplies the developer to the photosensitive drum through a developing roller. Japanese Patent Application Laid-open No. 2022-20305 has described a magnet roller that is used in the developing roller.

The magnet roller of the developing roller described in Japanese Patent Application Laid-open No. 2022-20305 includes a plurality of magnetic poles. The developing roller further includes a sleeve that covers the outer circumference of the magnet roller to be rotatable. The plurality of magnetic poles is formed of a plurality of different magnets. The magnet roller is assembled by bonding the plurality of magnets to the shaft.

SUMMARY OF THE DISCLOSURE

In accordance with one aspect of the present disclosure, a magnet roller includes a shaft, a plurality of magnets, and an adhesive. The plurality of magnets is arranged in a circumferential direction of a shaft center of the shaft on an outer surface of the shaft. The adhesive bonds the shaft and the plurality of magnets to each other. At least one of the plurality of magnets has a recess portion that is recessed with respect to a surface facing the outer surface of the shaft.

In accordance with another aspect of the present disclosure, a developing roller includes such a magnet roller and a tubular sleeve. The sleeve houses the magnet roller and is rotatably supported around the circumferential direction.

In accordance with still another aspect of the present disclosure, an image forming apparatus includes such a developing roller.

In accordance with the present disclosure, a technology capable of improving the productivity of the developing roller can be provided.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 8A is a diagram showing an example of measurement results of the bond strength and the magnetic properties of the magnet.

FIG. 8B is a diagram showing an example of measurement results of the bond strength and the magnetic properties of the magnet.

DETAILED DESCRIPTION OF THE EXEMPLARY EMBODIMENTS

Hereinafter, a magnet roller 1, 1*d* according to first and second embodiments of the present disclosure will be described with reference to the drawings. Note that in the figures, the same or corresponding portions will be denoted by the same reference signs and the descriptions will not be repeated. Moreover, in the following description, terms meaning positions and directions, e.g., "upper," "lower," "lateral," and "vertical" may be used. These terms are used for the sake of convenience to make the embodiment easily understood, and they are not limited to positions or directions when it is actually carried out.

First Embodiment

Figure 1:
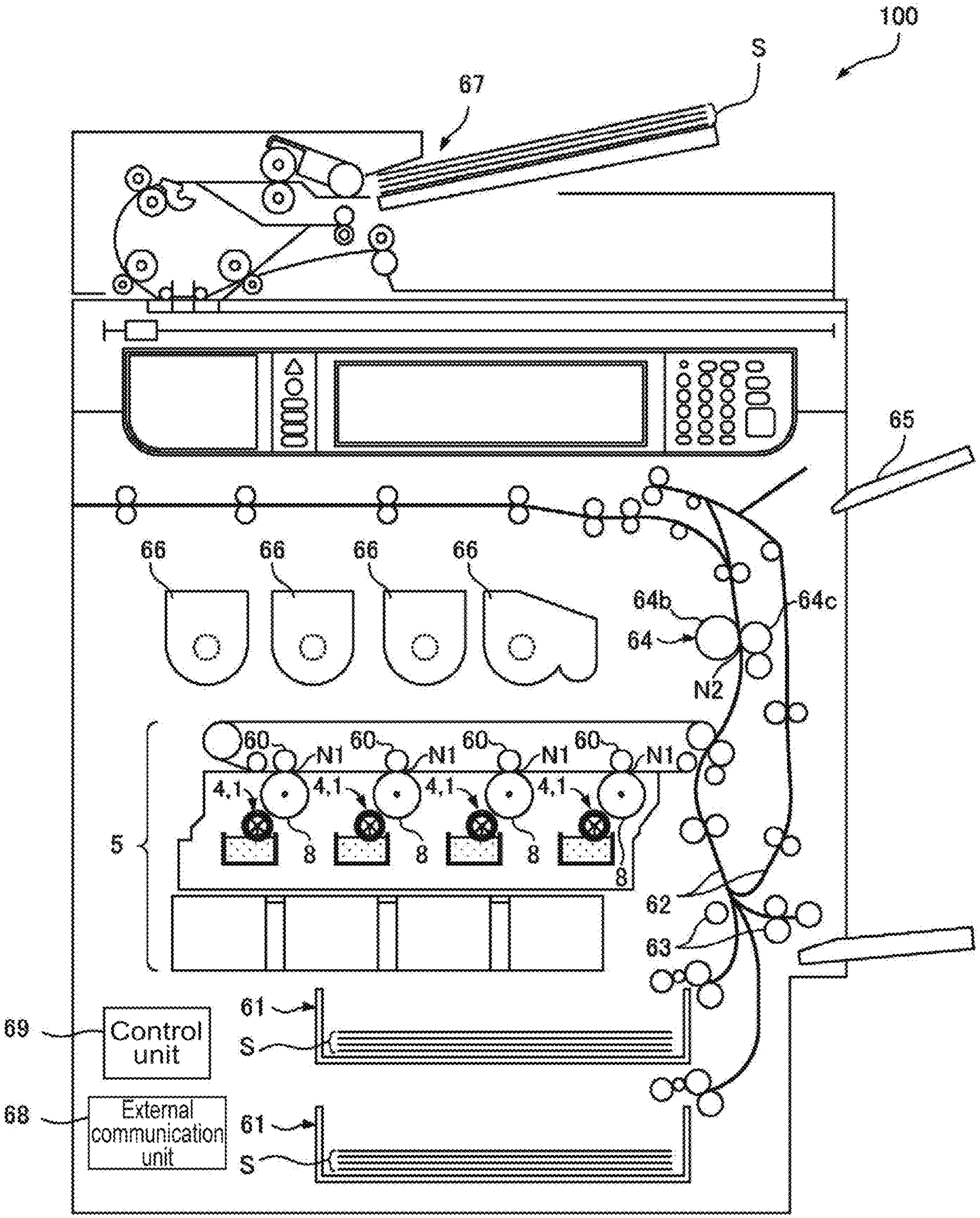
FIG. 1 is a view showing an internal configuration of an image forming apparatus with a magnet roller according to a first embodiment of the present disclosure.

An image forming apparatus 100 with the magnet roller 1 according to the first embodiment of the present disclosure will be described with reference to FIG. 1. FIG. 1 is a view showing an internal configuration of the image forming apparatus 100 with the magnet roller 1 according to the first embodiment of the present disclosure.

According to FIG. 1, the image forming apparatus 100 includes paper feed devices 61, conveyance paths 62, conveyance rollers 63, an image forming part 5, a fixation part 64, and a delivery tray 65. The paper feed devices 61 feeds sheets S. The sheets S fed from the paper feed devices 61 are conveyed on the conveyance paths 62. The conveyance rollers 63 convey the sheets S on the conveyance paths 62. The image forming part 5 is provided in the middle way of the conveyance paths 62 and forms a toner image on each of the sheets S. The fixation part 64 fixes the toner image formed on the sheet S. The delivery tray 65 delivers the sheet S on which the image is fixed.

The image forming part 5 includes photosensitive drums 8, exposure parts (not shown), developing parts 4, and transferring rollers 60. Toner images corresponding to image data are formed on surface layers of the photosensitive drums 8 by the exposure parts and the developing parts 4. Note that the image data is image data scanned by, for example, a script scanning part 67 or image data received by an external communication unit 68. A control unit 69 controls the external communication unit 68.

The transferring rollers 60 are brought into press-contact with the photosensitive drums 8 and form transferring nip regions N1 between the transferring rollers 60 and the photosensitive drums 8. A transferring voltage is applied on the surfaces of the transferring rollers 60. When the toner images on the surfaces of the photosensitive drums 8 pass through the transferring nip regions N1 together with the sheet S, the toner images are transferred to the sheet S and images are formed on the sheet S by electrostatic attraction of the transferring rollers 60. The sheet S on which the images are formed is conveyed to the fixation part 64.

The fixation part 64 includes a fixation roller 64*b* in which a heater is built and a press roller 64*c*. The press roller 64*c* is brought into press-contact with the fixation roller 64*b* and forms a fixation nip region N2 between the press roller 64*c* and the fixation roller 64*b*. When the sheet S on which the images are formed passes through the fixation nip region N2, the images are fixed on the sheet S by press and heating by the rollers 64*b* and 64*c*. The sheet S on which the images are fixed is conveyed to the delivery tray 65.

Figure 2:
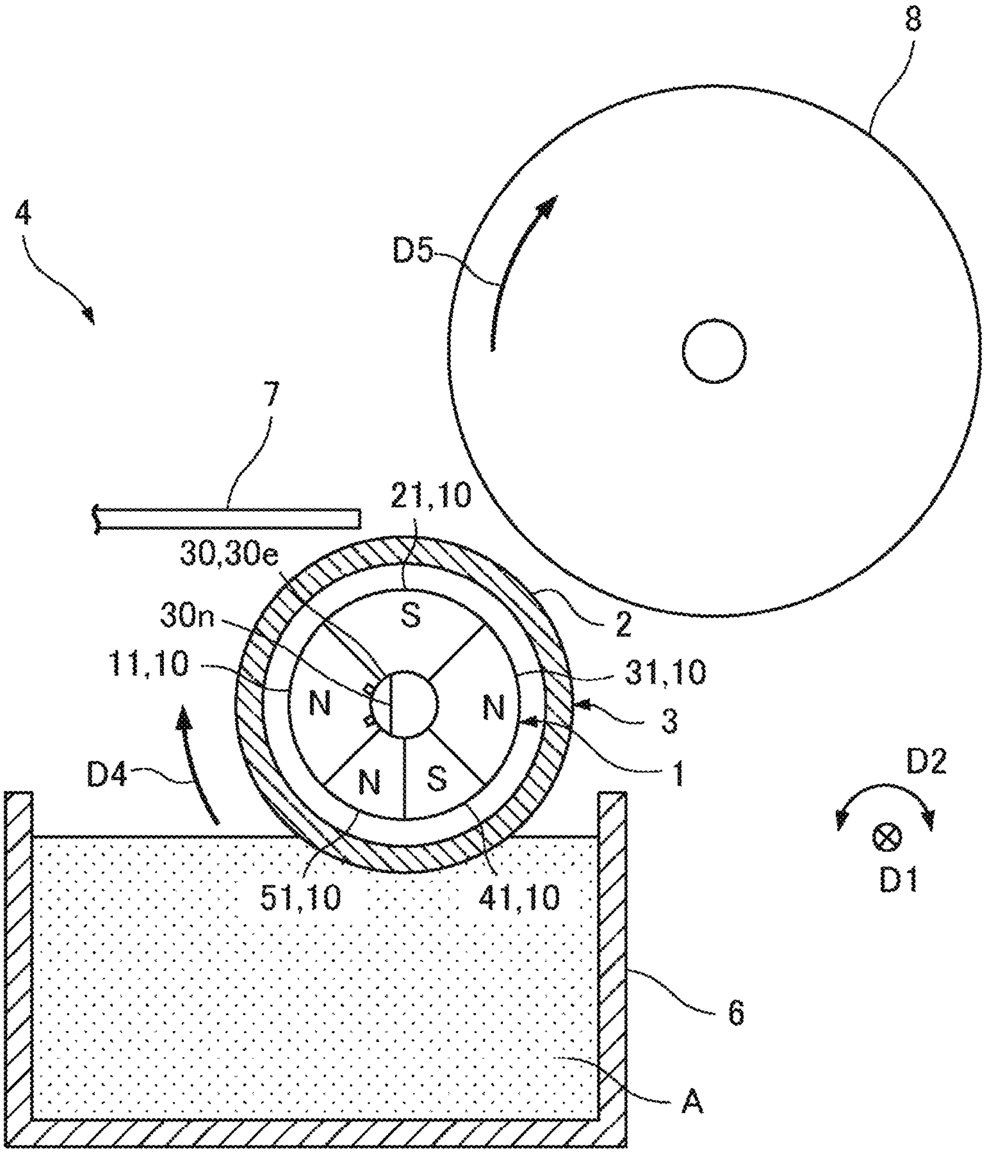
FIG. 2 is a view schematically showing a configuration of a developing part with the magnet roller.

Next, a configuration of the developing part 4 will be described with reference to FIG. 2. FIG. 2 is a view schematically showing a configuration of the developing part 4 with the magnet roller 1 according to the present disclosure.

In FIG. 2, the developing part 4 includes a developer storage part 6, a developing roller 3, and a regulating member 7. The developer storage part 6 stores a developer A. The developing roller 3 adsorbs the developer A from the developer storage part 6. The regulating member 7 rubs off the amount of the developer A absorbed by the developing roller 3 and regulates it to a certain amount.

The developing roller 3 supplies the absorbed and regulated developer A to the photosensitive drums 8. The developing roller 3 includes the magnet roller 1 and a sleeve 2. The magnet roller 1 has a plurality of magnetic poles. The sleeve 2 covers the outer periphery of the magnet roller 1 to be rotatable. The magnet roller 1 includes a columnar shaft 30 and a plurality of magnets 10. The plurality of magnets 10 is arranged in a circumferential direction D2 of the shaft 30 (an example of a circumferential direction of a shaft center).

The magnets 10 are provided to face an outer surface 30*e* of the shaft 30 and extends in an axial direction D1 of the shaft 30. The plurality of magnets 10 has inner surfaces that face the outer surface 30*e* of the shaft 30. The inner surfaces of the plurality of magnets 10 and the outer surface 30*e* of the shaft 30 are bonded to each other with an adhesive (not shown).

In this embodiment, the magnets 10 include a first magnet 11, a second magnet 21, a third magnet 31, a fourth magnet 41, and a fifth magnet 51. In this embodiment, the first magnet 11, the third magnet 31, and the fifth magnet 51 have their N poles facing radially outward, while the second magnet 21 and the fourth magnet 41 have their S poles facing radially outward.

Each of the magnetic poles included in the magnetic roller 1 has its own role and is required to make the magnetic force pattern on the surface of the sleeve 2 into a desired magnetic force waveform.

Specifically, each magnet such as the first magnet 11 corresponds to one of a pumping pole, a conveyance pole, a regulating pole, a developing pole, and a stripping pole. The pumping pole, the conveyance pole, the regulating pole, the developing pole, and the stripping pole are arranged along an arrow D4 direction (direction of rotation of the sleeve 2) shown in FIG. 2 in the stated order.

The developer A is constituted by toner and carrier (magnetic particles). The carrier is magnetically adsorbed on the magnetic roller 1 while carrying the toner. The developer A is charged by a charging apparatus (not shown), and is magnetically adsorbed on the pumping pole and adheres to the sleeve 2. The conveyance pole conveys the developer A that has adhered to the sleeve 2 toward the regulating pole.

The conveyed developer A is rubbed off by the regulating member 7, and the conveyance amount of the developer A becomes uniform. The developer A is conveyed to the developing pole after passing through the regulating pole. At the developing pole, the toner of the developer A is magnetically adsorbed and adheres to the photoconductor drum 8 rotating in an arrow D5 direction shown in FIG. 2. An electrostatic latent image corresponding to the image data has been formed on the surface layers of the photosensitive drum 8 by charging with the charging apparatus and exposure to light such as irradiation with laser light. The toner is adsorbed at a position of the surface layer of the photosensitive drum 8, where the electrostatic latent image has been formed. Therefore, the toner images corresponding to the image data is developed on the surface layer of the photosensitive drum 8.

Then, the developer A remaining on the sleeve 2 is conveyed to the stripping pole. The stripping pole is configured so that the magnetic field becomes weaker, and the developer A conveyed to the stripping pole is peeled off from the sleeve 2.

Figure 3:
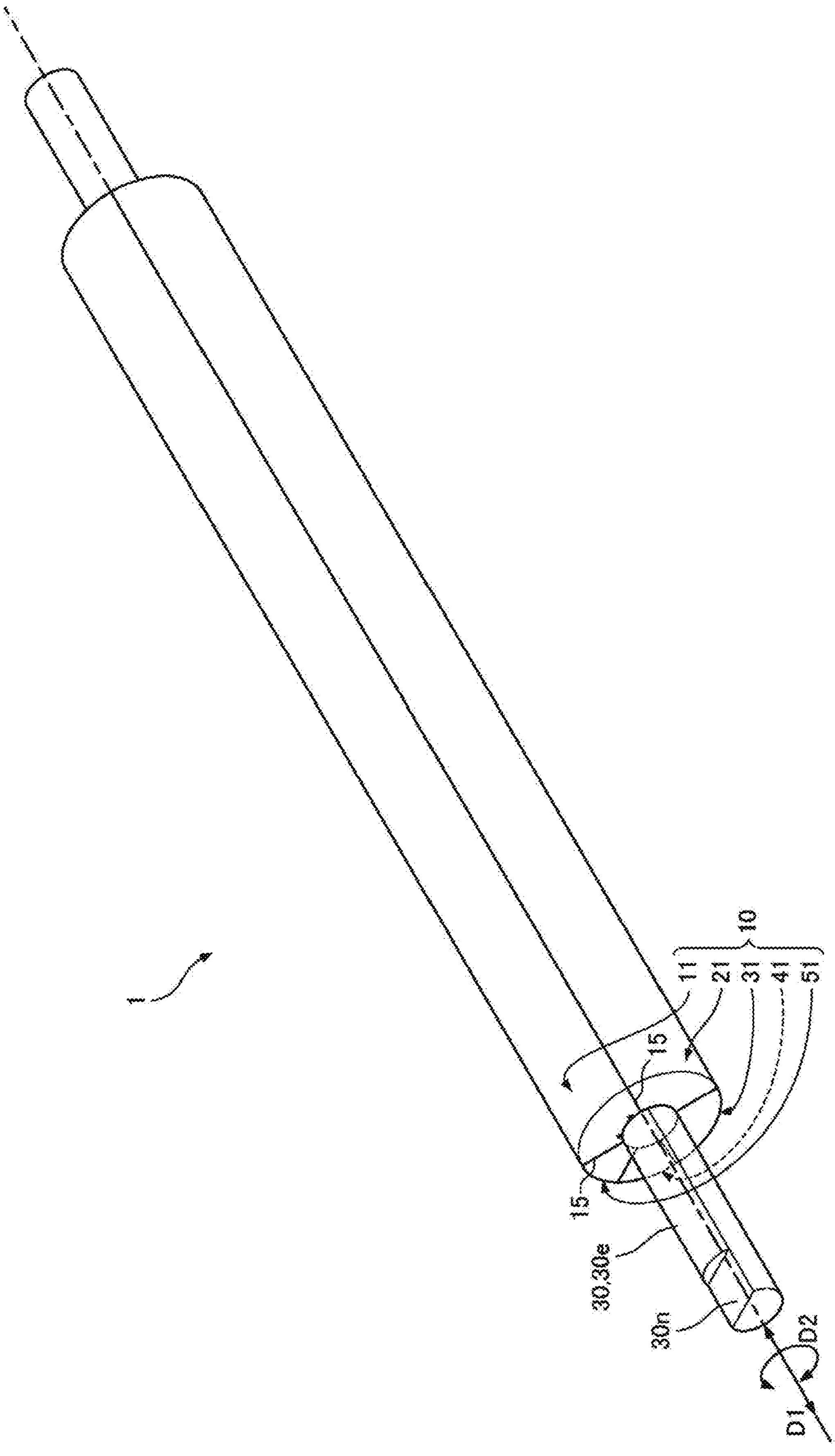
FIG. 3 is a perspective view showing a configuration of the magnet roller.

Next, a configuration of the magnet roller 1 will be further described with reference to FIG. 3. FIG. 3 is a perspective view showing the configuration of the magnet roller 1.

In FIG. 3, the shaft 30 has a cutout portion 30*n* on a part of the outer surface 30*e* at the end portion in the axial direction D1. The cutout portion 30*n* serves as a reference for positioning the shaft 30 in the circumferential direction D2.

In order to form a desired magnetic force pattern on the surface of the sleeve 2 (see FIG. 2) over the circumferential direction D2 of the shaft 30, each magnet needs to be accurately positioned in the circumferential direction D2 and bonded to the shaft 30. In this embodiment, each of the first magnet 11, the second magnet 21, the third magnet 31, the fourth magnet 41, and the fifth magnet 51 needs to be accurately positioned on the basis of the reference cutout portion 30*n* of the shaft 30.

Specifically, the first magnet 11 is first bonded to the shaft 30 at a desired position in the circumferential direction D2 on the basis of the reference cutout portion 30*n*. Then, the second magnet 21, the third magnet 31, the fourth magnet 41, and the fifth magnet 51 are sequentially bonded to the shaft 30 on the basis of the positions of side surfaces 15 of the first magnet 11 as a reference (to be described later in detail). The first magnet 11, the second magnet 21, the third magnet 31, the fourth magnet 41, and the fifth magnet 51 are bonded in a state in which they are arranged at desired positions in the circumferential direction D2 on the basis of the position of the cutout portion 30*n* as a reference. A desired magnetic pole pattern is thus formed on the surface of the sleeve 2 that covers the magnet roller 1.

Figure 4:
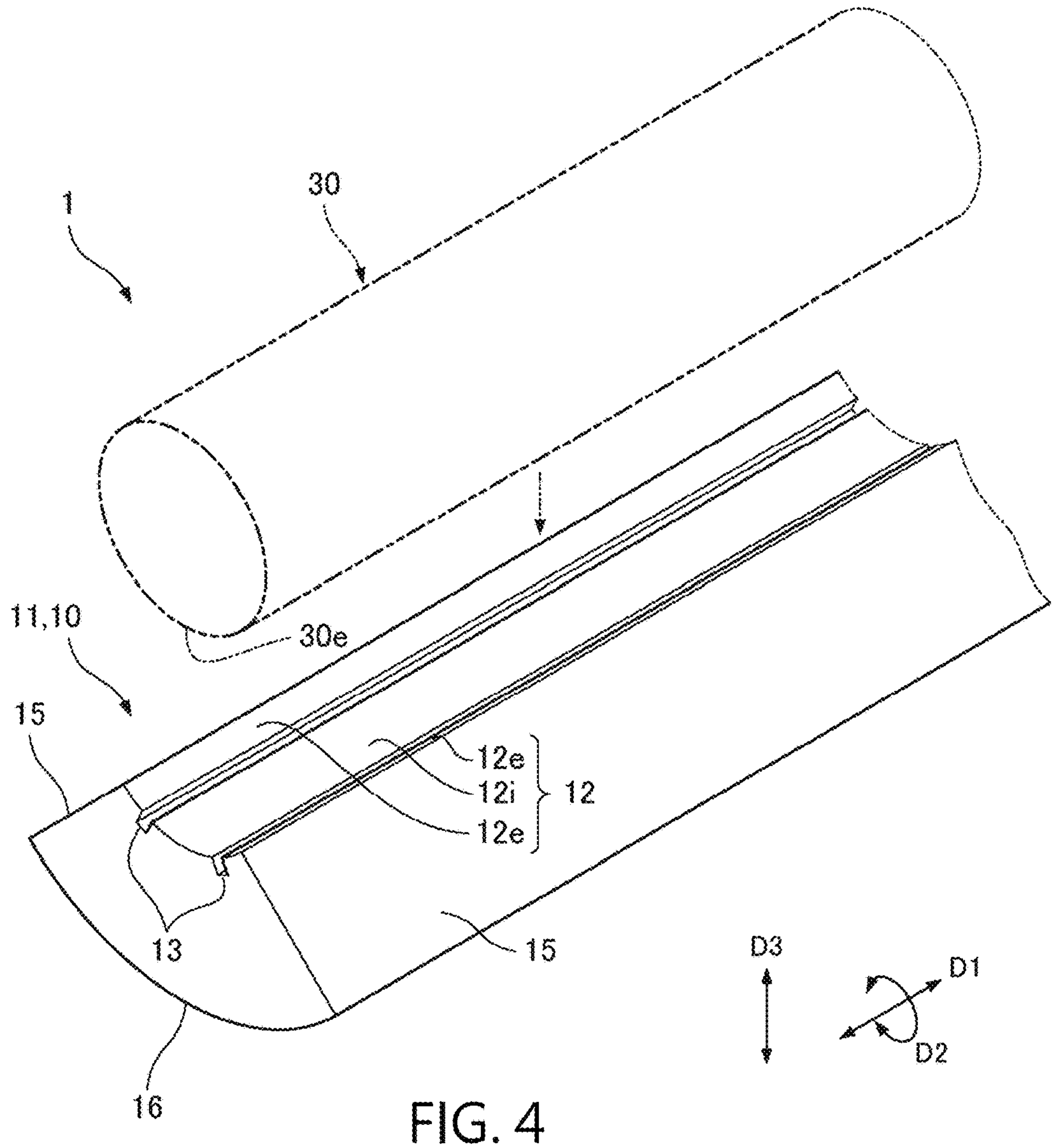
FIG. 4 is a perspective view showing a configuration of a magnet of the magnet roller.

Next, a configuration of the first magnet 11 of the magnet roller 1 according to the present disclosure will be described with reference to FIG. 4. FIG. 4 is a perspective view showing the configuration of the first magnet 11 of the magnets 10 of the magnet roller 1.

As shown in FIG. 4, the first magnet 11 has an inner surface 12 (an example of a surface), an outer surface 16, and two side surfaces 15. A cross-section of the inner surface 12, which faces the outer surface 30*e* of the shaft 30, has a circular arc-shape. The outer surface 16 is located outside the inner surface 12. The outer surface 16 has a curve line-shaped cross-section. The two side surfaces 15 connect the inner surface 12 and the outer surface 16 to each other in a radial direction D3 of the shaft 30.

Two grooves 13 (an example of a plurality of recess portions) extending in the axial direction D1 are provided in the inner surface 12. The two grooves 13 are provided at positions spaced apart from each other in the circumferential direction D2 on the inner surface 12. The inner surface 12 is divided into an inner surface 12*i* at the inside in the circumferential direction D2 and an inner surface 12*e* at the outside by the two grooves 13.

Figure 5A:
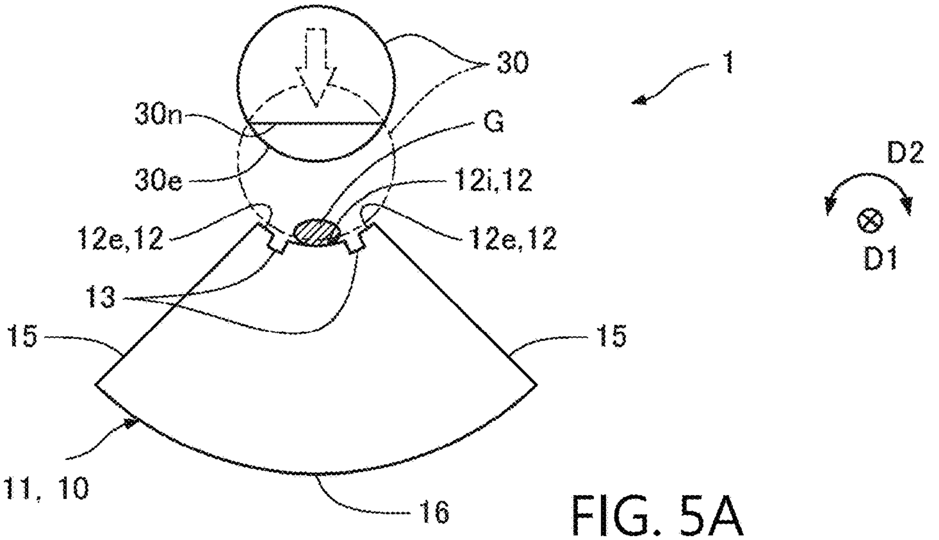
FIG. 5A is a view showing an assembling procedure of the magnet roller.
Figure 5B:
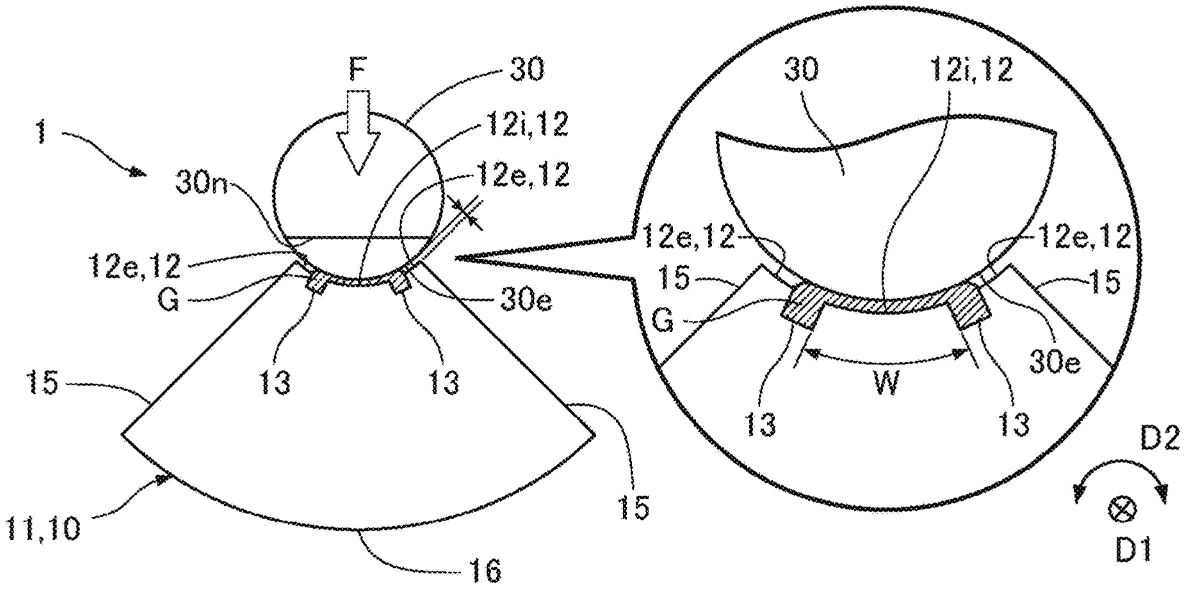
FIG. 5B is a view showing the assembling procedure of the magnet roller.
Figure 5C:
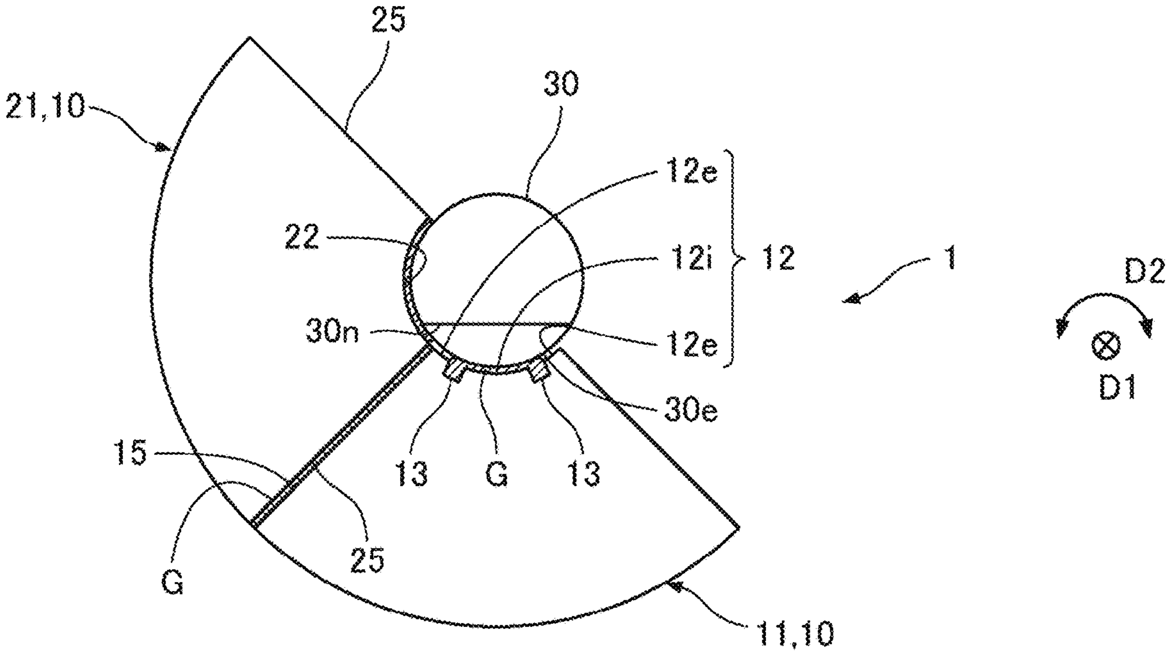
FIG. 5C is a view showing the assembling procedure of the magnet roller.

Next, an assembling procedure of the magnet roller 1 described above and actions thereof will be described with reference to FIGS. 5A, 5B, and 5C. FIGS. 5A, 5B, and 5C are views showing the assembling procedure of the magnet roller 1.

As described above, the first magnet 11 and the shaft 30 are first bonded when bonding the magnet 10 to the shaft 30. Then, the second magnet 21, the third magnet 31, the fourth magnet 41, the fifth magnet 51, and the shaft 30 are sequentially bonded.

As shown in FIG. 5A, an adhesive G is applied to the inner surface 12*i* inside the first magnet 11 when bonding the first magnet 11 to the shaft 30. Then, the shaft 30 is pushed against the inner surface 12 of the first magnet 11 as shown by the virtual lines in the same figure. When bonding the first magnet 11 to the shaft 30, the position of the first magnet 11 in the circumferential direction D2 with respect to the shaft 30 is accurately positioned when the outer surface 30*e* of the cutout portion 30*n* is pushed against the inner surface 12 of the first magnet 11.

Note that a designed value of the amount of application of the adhesive G is favorably determined to obtain a desired bonding thickness so as to maximize the bond strength. The designed value of the amount of application of the adhesive G is favorably set with a constant width in accordance with requirements (task reliability, costs, etc.) desired for production.

The second and subsequent magnets 21 are sequentially bonded by using the side surfaces 15 of the first magnet 11, whose bonding has been completed, as a reference surface for positioning. Therefore, it is favorable that the adhesive G solidifies and the bonding between the first magnet 11 and the shaft 30 is completed before the second magnet 21 is bonded.

FIG. 5B shows a state in which the bonding between the first magnet 11 and the shaft 30 has been completed. As shown in an enlarged view of FIG. 5B, the excess adhesive G from the applied adhesive G flows into the grooves 13 and does not leak out of the grooves 13. Accordingly, the adhesive G does not leak to the side surfaces 15 of the first magnet 11, as is conventionally the case. If the width and depth of the grooves 13 are set appropriately, the magnet roller 1 can be configured so that the adhesive G does not leak to the side surfaces 15 of the magnet 10 within a width that is the designed value of the amount of application of the adhesive G.

In addition, as shown in FIG. 5C, when the second magnet 21 is bonded, the side surfaces 15 of the first magnet 11, which has been already positioned, serve as a reference for positioning the second magnet 21 in the circumferential direction D2. Therefore, the second magnet 21 is accurately positioned and bonded to the shaft 30. As a result, the occurrence of gaps and floating as seen in a case of the conventional magnet can be suppressed. Since the second magnet 21 is accurately positioned, the third and subsequent magnets 31 can also be accurately positioned and bonded to the shaft 30.

As a result, the magnet roller 1 can suppress a reduction in bond strength because the bonding area between the magnets 10 and the shaft 30 does not decrease, and it can prevent the magnets 10 from being pealed off from the shaft 30 at the time of assembling the developing roller 3, for example. That is, the magnet roller 1 can improve the productivity of the developing roller 3.

In a case where the plurality of magnets is conventionally bonded to the shaft, if the amount of application of the adhesive to the magnets is large, the adhesive cures in a state of leaking to the side surfaces of the magnets. In this case, there can be floating between the shaft and the other magnets. This may cause a defect in assembling the developing roller, which may reduce the productivity of the developing roller. On the other hand, the above-mentioned magnet roller 1 can improve the productivity of the developing roller.

As in this embodiment, the two grooves 13 are provided at positions spaced apart from each other in the circumferential direction D2 on the inner surface 12 of the first magnet 11 at a distance from each other in the circumferential direction D2, thereby forming the inner surface 12*i* at the inside on the magnet 10. By forming the inner surface 12*i* at the inside, the leakage of the adhesive G is suppressed from both sides of the inner surface 12 in the circumferential direction D2, and thus the leakage of the adhesive G to the side surfaces 15 of the first magnet 11 is surely suppressed.

Although the shaft 30 according to this embodiment is configured to have a columnar shape, it may also be configured to have a polygonal cylindrical shape, such as a square cylindrical shape. In that case, the inner surfaces of the magnets 10, which face the outer surface 30*e* of the shaft 30, are favorably configured to have a shape corresponding to the shape of the outer surface 30*e* of the shaft 30.

Although the magnet roller 1 according to this embodiment is configured so that the grooves 13 are provided only in the first magnet 11 of the magnets 10, the magnet with the grooves 13 is not limited to the first magnet 11. The magnet roller 1 may be configured so that the grooves 13 are provided in any magnet of the second magnet 21, the second magnet 21, the third magnet 31, the fourth magnet 41, and the fifth magnet 51.

Although the grooves 13 are formed on the inner surface 12 of the magnet 10 in the magnet roller 1 according to this embodiment, the grooves 13 may be formed on the outer surface 30*e* of the shaft 30 or may be formed on both the inner surface of the magnet 10 and the outer surface 30*e* of the shaft 30.

Also in a case where the grooves 13 are formed on the outer surface of the shaft 30, the excess adhesive G of the applied adhesive G flows in the grooves 13 as described above, and does not leak out of the grooves 13. Therefore, the magnet roller 1 can provide actions and effects similar to the above-mentioned actions and effects.

Second Embodiment

Figure 6:
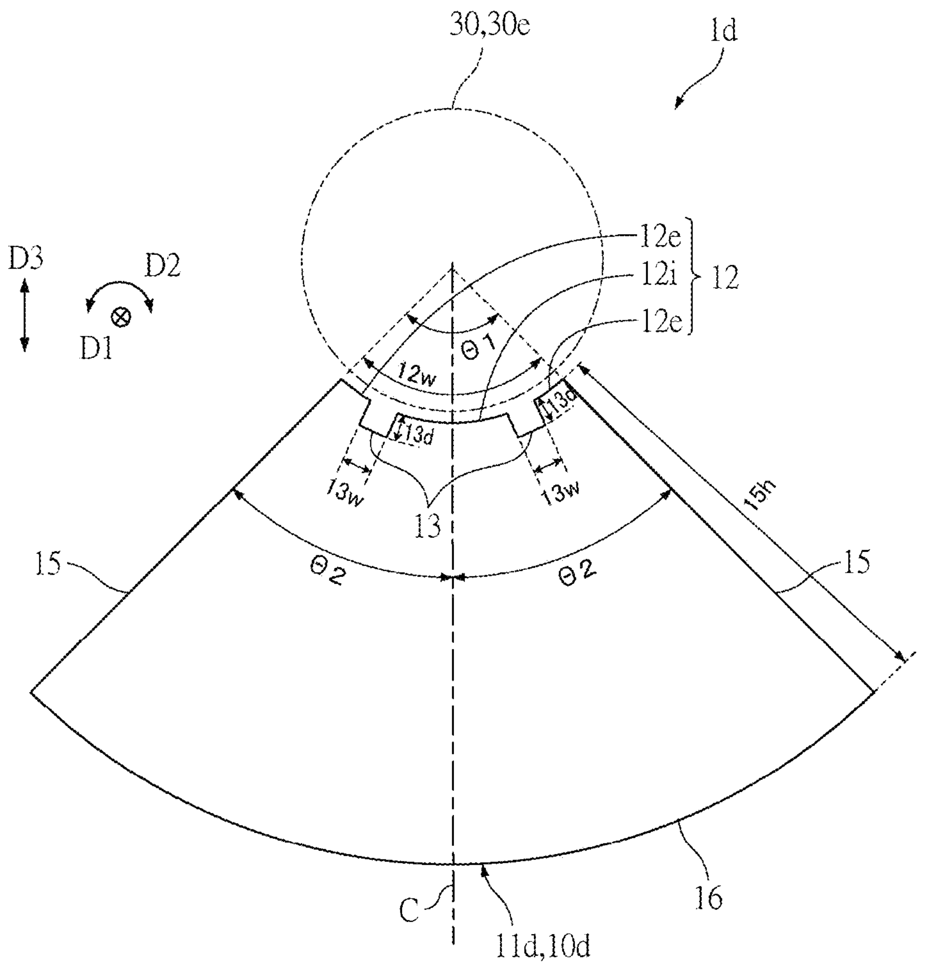
FIG. 6 is a plan view showing a configuration of a magnet roller according to a second embodiment of the present disclosure.

Next, a configuration of the magnet roller 1*d* according to the second embodiment will be described with reference to FIG. 6. FIG. 6 is a plan view showing a configuration of the magnet roller 1*d* according to the second embodiment of the present disclosure.

As shown in FIG. 6, a first magnet 11*d* of the magnet roller 1*d* further defines the range of a groove width 13*w* and a groove depth 13*d* with respect to the first magnet 11 of the magnet roller 1 according to the first embodiment.

Specifically, a ratio of the sum of the widths of the plurality of grooves 13 in the circumferential direction D2 (hereinafter, referred to as "groove width ratio") to a width 12*w* of the inner surface 12 of the first magnet 11*d* in the circumferential direction D2 of the shaft 30 is 12% or more and 25% or less.

Moreover, a ratio of a depth (hereinafter, referred to as "groove depth ratio") of each of the plurality of grooves 13 to a height 15*h* (an example of a dimension) of the first magnet 11*d* in the radial direction D3 of the shaft 30 is 7% or more and 14% or less.

Hereinafter, the actions by the configuration of the above-mentioned magnet roller 1*d* will be described, referring to test results related to the bond strength of the magnet roller 1*d* and the magnetic properties of the magnet roller 1*d*.

Figure 7A:
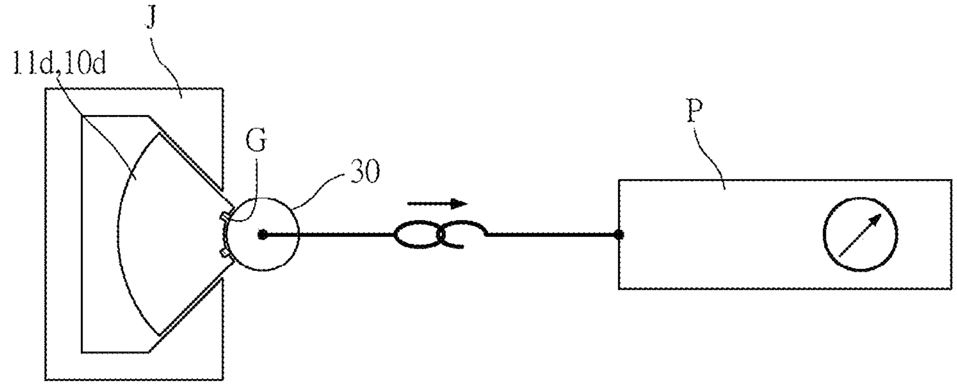
FIG. 7A is a view showing a test method for checking bond strength between the magnet and the shaft.
Figure 7B:
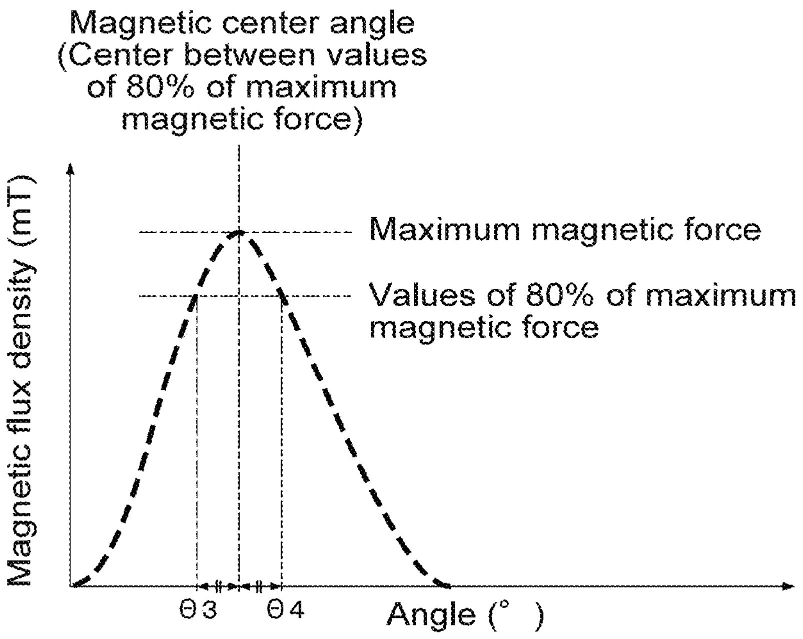
FIG. 7B is a diagram showing an example of measurement results of magnetic properties of the magnet roller.

First of all, respective test methods will be described with reference to FIGS. 7A and 7B. FIG. 7A is a view showing the test method for checking the bond strength of the magnet roller 1*d*. FIG. 7B is a diagram showing an example of measurement results of the magnetic properties of the magnet roller 1*d*.

The bond strength is measured on the basis of, for example, "Tensile Bond Strength Test Methods for Adhesives" (JIS K 6849-1994). Specifically, as shown in FIG. 7A, the bond strength tests are performed by supporting the first magnet 11*d* bonded to the shaft 30 with a jig J and using a push-pull gage P ("PS-10 Kg" manufactured by IMADA-SS Corporation). The push-pull gage P pulls the shaft 30 away from the first magnet 11*d*, and the maximum load required for separating the shaft 30 from the first magnet 11*d* is measured as "bond strength."

Although the illustration is omitted, a measurement element using a Hall element is disposed on a magnet 10*d* bonded to the shaft 30, and the magnetic properties of the bonded magnet 10*d* are detected by rotating the shaft 30. Then, the relationship between the rotation angle of the shaft 30 and the magnetic flux density detected by the Hall element is obtained as shown in FIG. 7B. Specifically, an "automatic magnetic field distribution measurement apparatus: 6800ROLL2" manufactured by Nihon Denji Sokki co., ltd. is used as a measurement apparatus. The measurement element is arranged at a position 10 mm from the center of the shaft 30 in the radial direction D3, and the rotational speed of the shaft 30 is set to be about 6 seconds per rotation. Under the same conditions as the above-mentioned conditions, the measurement is also performed in a case where the measurement elements are arranged at 9 positions in the axial direction D1 of the magnet 10, which divide the length of the magnet 10 into 10 equal parts.

In the measurement waveform obtained as shown in FIG. 7B, the maximum value of the magnetic flux density waveform shown in the figure is a "maximum magnetic force." Then, the rotation angle at the center of the two rotation angles θ3 and θ4, where the magnetic flux density is 80% of the maximum magnetic force, is determined as an "magnetic center angle. That is, these "maximum magnetic force" and "magnetic center angle" are checked as the magnetic properties.

Next, referring again to FIG. 6, the details of the first magnet 11*d*, the shaft 30, and the adhesive G used in the test will be described. The first magnet 11*d* has a fan-shape with an opening angle θ1 of 90° shown in the cross-section. The height 15*h* of the first magnet 11*d* is 5.7 mm, the axial length is 300 mm, the outer shape of the circular arc forming the inner surface 12 is Φ6 mm, and the outer shape of the circular arc forming the outer surface 16 is Φ17.4 mm. The grooves 13 are arranged at positions where the angle θ2 in the circumferential direction D2 is 25•with respect to a center line C of the first magnet 11*d* in the circumferential direction D2, respectively. The groove depth 13*d* of the grooves 13 is 0.3 mm and the groove width 13*w* is 0.6 mm. The material of the first magnet 11*d* contains polychloroethylene as a main component and 85 mass % of anisotropic ferrite is contained as magnetic powder. The shaft 30 has an outer diameter of Φ6 mm and an axial length of 330 mm. The material of the shaft 30 is SUM23 with nickel plating. For example, Aron Alpha (registered trademark) 800 series is used as the adhesive G. The amount of application of the adhesive G is 100 gm for example. The adhesive G is applied at a position along the center line C shown in the figure on the inner surface 12*i* at the inside. The drying time of the adhesive G is at least 1 hour at room temperature.

Test results in the above-mentioned test conditions will be described with reference to FIGS. 8A and 8B. FIG. 8A is a diagram showing an example of measurement results with bond strength and magnetic properties of the magnets 10 when the "groove width ratio" is at various levels. FIG. 8B is a diagram showing an example of measurement results with bond strength and magnetic properties of the magnets 10 when the "groove depth ratio" is at various levels.

FIGS. 8A and 8B show measurement results of the magnetic properties (maximum magnetic force, magnetic center angle) of the first magnet 11*d* and the bond strength between the first magnet 11*d* and the shaft 30 when only a first magnet 11*d* is bonded to the shaft 30. Then, the measurement results of the magnetic properties of the second magnet 21 (see FIG. 3) when the second magnet 21 is bonded to the shaft 30 in addition to the first magnet 11*d* are shown. Note that the reference rotation angle (0°) in the "magnetic center angle" in FIGS. 8A and 8B is an angle overlapping the center line C of the first magnet 11*d* in the circumferential direction D2 (see FIG. 6).

According to FIG. 8A, when the groove width ratio is 12% or more and 25% or less as described above, the magnetic properties of the first magnet 11*d*, the bond strength, and the magnetic properties of the second magnet 21 are stable and are in the range of more favorable results. Therefore, if the groove width ratio of the magnet roller 1*d* is in the range of 12% or more and 25% or less, the product performance is stably ensured, so an improvement in quality is achieved.

According to FIG. 8B, when the groove depth ratio is 7% or more and 14% or less as described above, the magnetic properties of the first magnet 11*d*, the bond strength, and the magnetic properties of the second magnet 21 are stable and are in the range of more favorable results. Therefore, if the groove width ratio of the magnet roller 1*d* is in the range of 7% or more and 14% or less, the product performance is stably ensured, so an improvement in quality is achieved.

Note that the grooves 13 described in the first embodiment of the present disclosure are an example of the recess portions, and the shape of the recess portion is not limited to the groove shape. For example, the bottom of the recess portion may be curved, R-shaped, or rounded. Even if the recess portion is configured in this way, excess adhesive G of the applied adhesive G flows into the recess portion, and actions and effects similar to the above-mentioned actions and effects can be provided. Moreover, also in the second embodiment, as long as the groove width 13$w$ and the groove depth 13$d$ in the grooves 13 are in the above-mentioned range, the edges of the grooves 13, the corners of the bottoms, or the like may be chamfered or rounded.

Note that in the above-mentioned first and second embodiments, the plurality of magnets 10, 10$d$ is favorably molded from a blend material including magnetic powder and resin, and in addition, the magnetic powder may be configured to include ferrite. Accordingly, the magnets 10, 10$d$ can be molded by injection molding or the like, so that the magnets 10, 10$d$ can be molded with grooves 13 in the present disclosure.

Moreover, the plurality of magnets 10, 10$d$ is favorably molded from a blend material including magnetic powder and resin. In addition, the magnetic powder may be constituted by a mixture of ferrite and rare-earth magnetic powder. In general, rare earth magnetic powders have stronger magnetic force and better temperature characteristics than ferrite magnetic powders. Therefore, if the magnetic powder is constituted by a mixture of ferrite and rare-earth magnetic powder, it is possible to further enhance the compactness, lightness, and high performance in the operating environment, and to improve the degree of freedom in design.

Hereinabove, the embodiment of the present disclosure has been described with reference to the drawings. Note that the present disclosure is not limited to the above-mentioned embodiment, and may be carried out in various aspects without departing from the gist. For easy understanding, the drawings each schematically show configurations of elements mainly, and the thickness, the length, the number of items, the intervals, and the like of each component shown in the figure are different from the actual ones for the sake of convenience for creating the drawings. Moreover, the material, the shape, the dimensions, and the like of each component shown in the above-mentioned embodiment, and there are no particular limitations and various modifications can be made without substantially departing from the configurations of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. A magnet roller, comprising:

a shaft;

a plurality of magnets that is arranged in a circumferential direction of a shaft center of the shaft on an outer surface of the shaft; and an adhesive that bonds the shaft and the plurality of magnets to each other, wherein at least one of the plurality of magnets has a plurality of recess portions that is recessed with respect to an inner surface of the magnet facing the outer surface of the shaft;

the plurality of recess portions are spaced apart from each other in the circumferential direction, and a ratio of a sum of widths of the plurality of recess portions in the circumferential direction to a width of the inner surface of the magnet in the circumferential direction is 12% or more and 25% or less.

2. The magnet roller according to claim 1, wherein the plurality of magnets is molded from a blend material including magnetic powder and resin, and the magnetic powder includes ferrite.

3. The magnet roller according to claim 1, wherein the plurality of magnets is molded from a blend material including magnetic powder and resin, and the magnetic powder is a mixture of ferrite and rare-earth magnetic powder.

4. A developing roller, comprising:

a magnet roller according to claim 1; and a tubular sleeve that houses the magnet roller and is rotatably supported around the circumferential direction.

5. An image forming apparatus comprising a developing roller according to claim 4.

6. A magnet roller, comprising:

a shaft;

a plurality of magnets that is arranged in a circumferential direction of a shaft center of the shaft on an outer surface of the shaft; and an adhesive that bonds the shaft and the plurality of magnets to each other, wherein at least one of the plurality of magnets has a plurality of recess portions that is recessed with respect to an inner surface of the magnet facing the outer surface of the shaft, the plurality of recess portions are spaced apart from each other in the circumferential direction, and a ratio of a depth of each of the plurality of recess portions with respect to a entire height of the magnet in a radial direction of the shaft center is 7% or more and 14% or less.

* * * * *